E. GRUENFELDT.
LOCK MECHANISM FOR CONTROLLER ARMS.
APPLICATION FILED APR. 5, 1910.
1,052,914.
Patented Feb. 11, 1913.
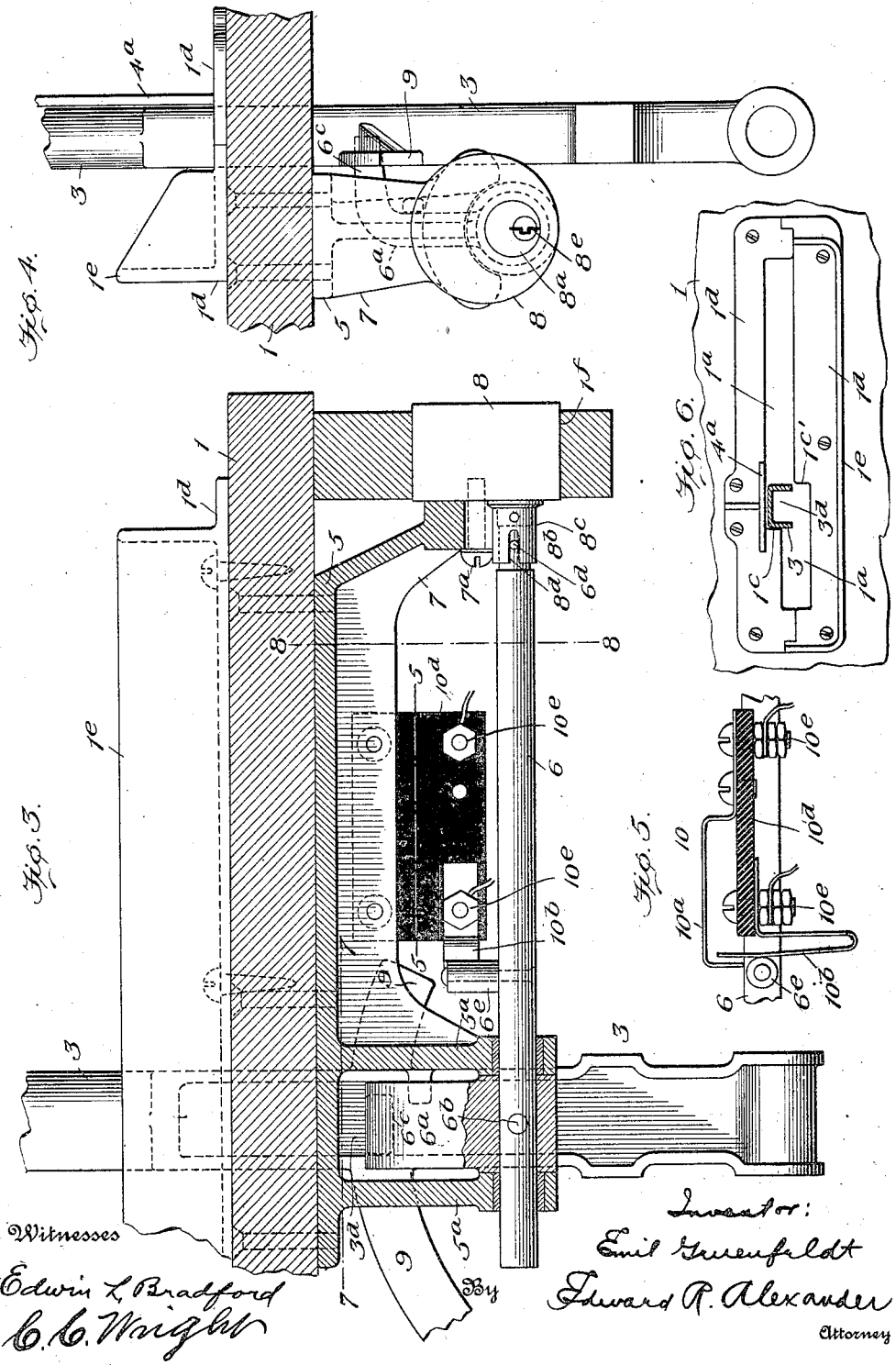

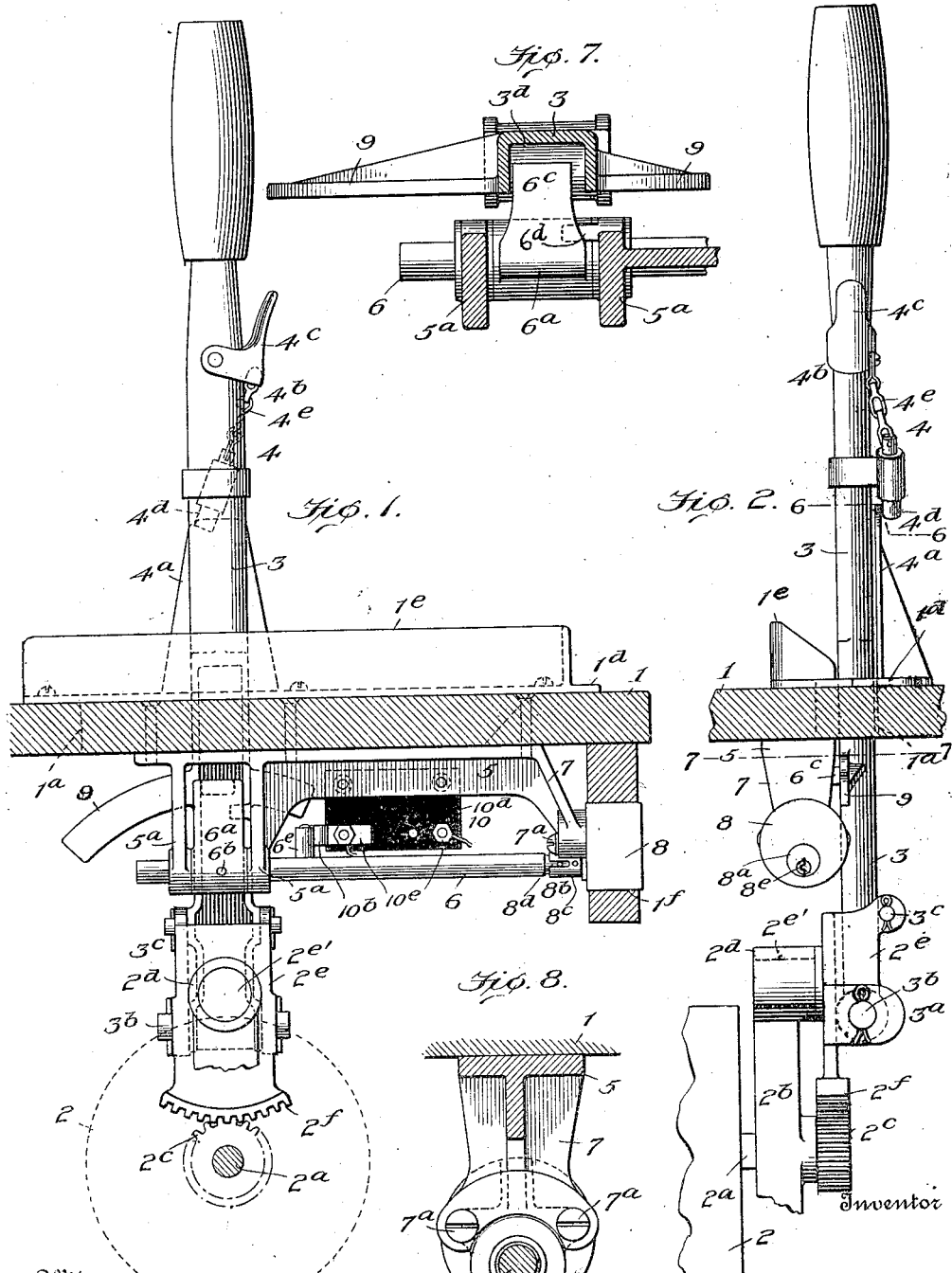

UNITED STATES PATENT OFFICE.

EMIL GRUENFELDT, OF CLEVELAND, OHIO, ASSIGNOR TO THE BAKER MOTOR VEHICLE
COMPANY, OF CLEVELAND, OHIO, A CORPORATION OF OHIO.

LOCK MECHANISM FOR CONTROLLER-ARMS.

1,052,914.  Specification of Letters Patent.  Patented Feb. 11, 1913.

Application filed April 5, 1910. Serial No. 553,862.

*To all whom it may concern:*

Be it known that I, EMIL GRUENFELDT, a subject of the Emperor of Germany, residing at Cleveland, in the county of Cuyahoga and State of Ohio, have invented certain new and useful Improvements in and Relating to Lock Mechanism for Controller-Arms, of which the following is a specification.

This invention relates to means for locking the operating or controlling arm, lever or crank, which controls the motive power of a self-propelled vehicle, either forward or backward, or both, whereby a person or persons who is or are unauthorized to operate or use the vehicle, will be prevented from setting the vehicle or its motor in motion.

For the purpose of illustration, I have, in the accompanying drawings, shown and herein described one form of locking mechanism embodying my invention.

Figure 1 is a side elevation of an operating arm and a portion of a self-propelled vehicle showing the application thereto of a locking mechanism embodying my invention. Fig. 2 is a front elevation looking from the right of Fig. 1. Fig. 3 is a longitudinal sectional view of the locking mechanism. Fig. 4 is a front view thereof. Fig. 5 is a detail sectional view illustrating the cut-out for the bell circuit, taken on the line 5—5 of Fig. 3. Fig. 6 is a section on the line 6—6 of Fig. 2, the arm-releasing mechanism being removed. Fig. 7 is a fragmentary section, enlarged, on the line 7—7 of Fig. 2. Fig. 8 is a transverse section on the line 8—8 of Fig. 3.

In the drawings, 1 indicates a frame or body of a vehicle which may be driven by a suitable motor, preferably an electric motor.

2 indicates a controller drum for the motor.

$2^a$ indicates an axle or shaft for the drum 2.

$2^b$ indicates a support provided with suitable bearings in which the shaft $2^a$ is mounted.

$2^c$ indicates a gear fixed to the shaft $2^a$.

$2^d$ indicates a bearing carried by the support $2^b$.

$2^e$ indicates a frame provided with a pin or shaft $2^{e\prime}$ rotatably mounted in the bearing $2^d$.

$2^f$ indicates a gear segment carried by the frame $2^e$ and meshing with the gear $2^c$ to operate the drum 2.

3 indicates an arm or lever connected at $3^a$ with the frame $2^e$, whereby it and the frame $2^e$ may be swung forwardly and rearwardly on the pin or stud shaft $2^{e\prime}$. The connection $3^a$ preferably comprises a pin $3^b$ mounted in the frame $2^e$ at right angles to the axis of the pin $2^{e\prime}$, and operating as a pintle or pivotal connection for the arm 3. The purpose and function of this pivotal connection will be later described.

$3^c$ indicates a stop device for limiting the movement of the arm 3 on its pivot $3^a$. It will be understood that when the arm or lever 3 is in a substantially vertical position, the rotating driving member of the vehicle, or the rotating driving member of the motor is stationary, and that the operation of the vehicle forwardly or backwardly may be controlled by moving the arm or lever 3, in one direction or the other with reference to its vertical or neutral position. When the arm or lever 3 is moved from its neutral position, the segment $2^f$ meshing with the gear $2^c$, rotates the drum 2 and thus operates the motor of the vehicle.

$1^a$ indicates a pair of connected guide slots formed in the vehicle frame or body 1 and through which slots the controlling arm 3 moves in its forward and backward movements. These slots are preferably offset, relatively to each other, whereby are formed shoulders or stops $1^c$, $1^{c\prime}$, against which the arm 3 abuts when returned to the neutral position. By oscillating the arm 3 on its pivot $3^b$, it may be thrown from one slot into the other slot.

$1^d$, $1^d$, indicate plates cast or formed with cutaway portions which, when placed side by side, define the walls of the slots $1^a$. These plates may be secured upon the body 1 in relative position to each other by screws or bolts.

$1^e$ indicates a vertical wall carried by one of said plates $1^d$, and extending longitudinally thereof adjacent to its cutaway portion. This wall $1^e$ operates to prevent cushions, appliances, or articles from overlying the slots $1^a$ and obstructing the path of movement of the lever or arm 3.

4 indicates devices for controlling the movement of the arm 3 from one slot $1^a$ to the other slot $1^a$. These devices preferably comprise a vertically arranged plate 4ª, which is preferably formed integral with one of the plates 1ᵈ, and a releasing mechanism 4ᵇ coöperating with the plate 4ª to permit the movement of the arm 3 from one slot to the other. The release mechanism 4ᵇ may consist of a lever 4ᶜ pivotally mounted near the handle of the arm 3, a release pin 4ᵈ carried by the arm 3, and a connection 4ᵉ between the lever 4ᶜ and the release pin 4ᵈ.

It will be understood that the plate 4ª is arranged in juxtaposition with reference to the arm 3 so that when the latter lies in one slot 1ª in neutral position, the release pin 4ᵈ engages with one face of the plate 4ª, and when the arm 3 is in the other slot 1ª in neutral position, the release pin 4ᵈ engages with the opposite face of the plate 4ª. By operating the release lever 4ᶜ, the release pin 4ᵈ is lifted above the free end of the plate 4ª, whereby the arm 3 may be thrown from one slot to the other.

5 indicates a support or bracket member provided with two feet 5ª near the end adjacent to the arm 3. This plate is preferably arranged below the frame of the vehicle body 1, and adjacent to the slots 1ª.

6 indicates a rock shaft mounted in suitable bearings provided in the feet 5ª.

6ª indicates a plate or latch member carried by the shaft 6.

6ᵇ indicates a pin for securing the plate to the shaft. The free end of the plate or latch member is curved laterally to form a latch 6ᶜ which engages with the arm 3.

6ᵈ indicates a stop carried by a foot 5ª for limiting the throw of the latch member.

3ᵈ indicates a recess formed in the arm 3, into which recess the latch 6ᶜ projects to lock the arm 3 in neutral position. The plate 6ª is preferably arranged between the feet 5ª and has bearing engagement therewith whereby the shaft 6 is locked against axial movement.

7 indicates an arm preferably carried by the plate or support 5 at that end opposite to the feet 5ª.

8 indicates a casing mounted within a recess or opening 1ᶠ formed in the vehicle body 1 and secured to the arm 7 by suitable devices indicated at 7ª.

8ª indicates a locking mechanism mounted within the casing 8.

8ᵇ indicates a coupling member for connecting the movable part of the locking mechanism with the rock shaft 6. This coupling member preferably comprises a sleeve 8ᶜ into which the adjacent end of the rock shaft 6 slidably fits. The sleeve 8ᶜ may be formed with a slot 8ᵈ which receives a pin 6ᵈ carried by the shaft 6. The locking mechanism 8ª is controlled by a suitable key which fits the key-hole or opening 8ᵉ.

Detail illustration and description of the locking mechanism is omitted as it will be understood that any form of lock or locking device which is operated by an individual key, may be used.

The form of locking mechanism illustrated is preferably a Yale lock as that construction of lock cannot be operated by a pass key.

It will be understood that my invention permits the person running the car to lock the controller or operating arm or lever so that he can leave the car or vehicle in public places without fear of some other person using it.

From the foregoing description it will be seen that by inserting the key in the keyhole and operating the locking mechanism 8ª, the shaft 6 is rocked in its bearings and throws the latch 6ᶜ into the recess 3ᵈ of the arm 3; and that by operating the locking mechanism in the opposite direction, the latch 6ᶜ disengages the arm 3 whereby the latter is free to move forwardly and backwardly in the slots 1ª.

9 indicate devices which prevent the operation of the latch 6ᶜ at any time except when the arm 3 is in neutral position. These devices preferably comprise a pair of curved plates preferably formed integral with and extending from opposite sides of the arm 3. These devices are arranged in position to be engaged by the latch 6ᶜ in case the latter is operated while the arm 3 is forward or backward of its neutral position. By this construction and arrangement it will be understood that the latch 6ᶜ is maintained out of the path of movement of the arm 3 in case the key-locking mechanism is operated for any reason while the arm 3 is in either forward or backward operative position.

10 indicates means for preventing the ringing of the bell. These means preferably form part of an electric bell circuit and comprise a stationary contact 10ª, a yieldable contact 10ᵇ normally engaging the contact 10ª, and a contact breaker 6ᵉ. This contact breaker 6ᵉ is preferably carried by the rock shaft 6 and engages with the movable contact 10ᵇ when the former is rocked into locking position. The movable contact 10ᵇ preferably comprises a flat spring having an inclined arm with which the breaker 6ᵉ engages to disconnect it from the contact 10ª.

10ᵈ indicates a support of insulated material for the contacts 10ª, 10ᵇ. This support is provided with suitable contacts 10ᵉ to which the wires of the bell circuit are connected. When the latch is thrown into locking engagement with the arm 3, the contact breaker 6ᵉ separates the contacts 10ª, 10ᵇ and thus breaks the bell circuit. It will, therefore, be understood from the foregoing description, that when the vehicle is left standing and its operating arm or lever 3 is locked, the bell circuit is simultaneously broken by the operation of the arm-locking devices. Under these conditions the bell cannot be rung or tampered with while the car or vehicle is not in use. When the arm 3 is unlocked, the bell circuit is automatically closed by the spring operated contact 10$^b$.

To those skilled in the art of making devices of the class described, many alterations in construction and widely differing embodiments and applications of my invention will suggest themselves, without departing from the spirit and scope thereof.

My disclosures and the description herein are purely illustrative, and are not intended to be in any sense limiting.

What I claim is—

1. In a lock mechanism for motor vehicles, the combination with an arm or lever adapted for controlling the movements of a vehicle, of key-operated locking mechanism for locking the arm or lever in inoperative position, and means for preventing the operation of the locking mechanism at any time except when the arm or lever is in off-position.

2. In a lock mechanism for motor vehicles, the combination with a motor controller and an arm or lever for controlling the movements of a vehicle, of key-operated locking mechanism for locking the arm or lever in inoperative position, and means carried by the said arm or lever for preventing the operation of the locking mechanism at any time except when the arm or lever is in off-position.

3. In a lock mechanism for motor vehicles, the combination with a motor controller and an arm or lever, formed with a recess or opening, adapted for controlling the movements of a vehicle, and locking mechanism for said arm or lever including a rock shaft, a swingable latch fixed to said shaft and arranged to enter said recess or opening, and key mechanism for operating said rock shaft.

4. The combination with a frame formed with a slot, a lever movable through said slot for controlling the operation of a vehicle, a pair of supports, provided with bearings, depending from said frame adjacent to said slot therein, a rock shaft mounted in said bearings, a latch fixed to said rock shaft and arranged to engage said lever to lock it against movement, and means for operating the rock shaft.

5. In a lock mechanism for motor vehicles, the combination with an arm or lever adapted for controlling the movements of a vehicle, of a rock shaft, a latch operated by the said rock shaft and arranged to engage and disengage said arm or lever, and key-operated locking mechanism for operating the rock shaft.

6. The combination with a frame formed with a pair of connected slots and a motor controller, of an arm or lever movable through each of said slots for controlling the movements of the controller, and a guard device for preventing the obstruction of the slots.

7. The combination with a frame, of a pair of plates formed with cutaway portions arranged, when placed side by side, to define a pair of slots, an arm or lever movable through each of said slots for controlling the forward and backward movements of a controller device, and a guard device carried by one of said plates for preventing the obstruction of the slots.

8. The combination with a frame formed with a pair of connected slots, an arm or lever for controlling the operation of a vehicle and movable through said slots, the slots being off-set and overlapping each other a distance substantially equal to the width of said arm or lever, and a locking member arranged to engage with and lock the said arm or lever when it is in either of said slots.

9. The combination with a frame formed with a pair of connected slots, off-set relatively to each other, and a motor controller, of an arm or lever movable through each of said slots for controlling the movements of the said controller, means permitting the swinging of the arm from one slot to the other, and means for normally preventing the swinging of the arm or lever from one slot to the other.

10. The combination with a frame formed with a pair of connected slots, off-set relatively to each other, and a motor controller, of an arm or lever movable through each of said slots for controlling the movements of the said controller, means permitting the swinging of the arm from one slot to the other, and releasable means for normally preventing the swinging of the arm or lever from one slot to the other.

11. The combination with a frame and a motor controller, a pair of plates mounted on the said body or frame, the said plates being formed with cutaway portions arranged, when placed side by side, to form a pair of connected slots off-set relatively to each other, an arm or lever movable through each of said slots for controlling the movements of the controller, means for pivotally supporting the arm or lever whereby it may swing from one slot into the other slot, a lock plate arranged in juxtaposition to the arm or lever, and means carried by the arm and engaging with the said plate for normally preventing the movement of the arm or lever from one slot into the other.

12. The combination with a frame portion formed with a pair of connected slots off-set relatively to each other and a motor controller, of an arm or lever movable forwardly and rearwardly for controlling the movement of the controller, pivotal supporting means for permitting the swinging of the arm from one slot into the other, and means normally preventing the said swinging movements of the arm.

13. The combination with a frame portion formed with a pair of connected slots off-set relatively to each other and a motor controller, of an arm or lever movable forwardly and rearwardly for controlling the movement of the controller, pivotal supporting means for permitting the swinging of the arm from one slot into the other, and release mechanism for normally preventing the said swinging movements of the arm.

14. The combination with a frame portion formed with a pair of connected slots off-set relatively to each other and a motor controller, of an arm or lever movable forwardly and rearwardly for controlling the movement of the controller, pivotal supporting means for permitting the swinging of the arm from one slot into the other, a plate arranged in juxtaposition to the arm or lever, and means carried by the arm or lever arranged to engage with the said plate for normally preventing the swinging movements of the said arm or lever.

15. The combination with a frame formed with a pair of connected slots and a motor controller, of means for operating the said controller, the said means comprising a pivotally mounted frame, an arm or lever movable through the said slots, and means for pivotally supporting the said arm or lever on an axis at right angles to the axis of the said frame, a key mechanism, and a member movable into and out of engagement with said arm or lever arranged to be operated directly by the turning of the key of said key mechanism.

16. The combination with a frame having a pair of connected slots extending in opposite directions and off-set relatively to each other, an arm or lever, supporting means for said arm or lever permitting it to move through either of said slots and to swing at right angles to such movement from one slot to the other, and means preventing the swinging of said arm or lever from one slot to the other but permitting it to move from end to end of the adjacent slot.

17. The combination with a frame having a pair of connected slots extending in opposite directions and off-set relatively to each other, an arm or lever, supporting means for said arm or lever permitting it to move through either of said slots and to swing at right angles to such movement from one slot to the other, means preventing the swinging of said arm or lever from one slot to the other but permitting it to move from end to end of the adjacent slot, and separate means for locking the arm or lever against movement through said slots.

18. The combination with a frame formed with a pair of connected slots off-set relatively to each other, and a motor controller, of means for operating the said controller, the said means comprising a pivotally mounted frame, an arm or lever movable through the said slots, and means for pivotally connecting the said arm or lever on the said frame to permit its movement from one slot into the other slot, a key mechanism, a member movable into and out of engagement with said arm or lever, and a rock shaft interposed between said key mechanism and said member whereby the operation of the key of said mechanism rocks the shaft to move the said member.

19. The combination with a frame formed with a pair of connected slots off-set relatively to each other, and a motor controller, of means for operating the said controller, the said means comprising a pivotally mounted frame, an arm or lever movable through the said slots, means for pivotally connecting the said arm or lever on the said frame to permit its movement from one slot into the other slot, and means for normally preventing the swinging of the arm from one slot to the other slot, and means for locking the arm or lever in its off-position.

20. The combination with a frame, of an arm or lever swingably mounted in said frame, the frame being formed with two slots extending in opposite directions and overlapping each other at their inner ends, the said slots being off-set relatively to each other to form stops at the inner ends thereof, and connected together by a space along their overlapped portions, and means permitting the arm or lever to swing from one slot to the other when opposite said connecting space between the slots.

21. The combination with a frame, of an arm or lever swingably mounted in said frame, the frame being formed with two slots extending in opposite directions and overlapping each other at their inner ends, the said slots being off-set relatively to each other to form stops at the inner ends thereof and connected together by a space along their overlapped portions, means permitting the arm or lever to swing from one slot to the other when opposite said connecting space between the slots, and means normally preventing the arm or lever to swing from one slot to the other.

22. The combination with a frame formed with a slot, of an arm or lever movable through said slot, a rock shaft, a latch controlled by said shaft and arranged to engage and disengage said arm or lever by the operation of said rock shaft, and a key mechanism for operating the rock shaft.

23. The combination with a frame formed with a slot, of an arm or lever movable through said slot, a rock shaft, a latch controlled by said shaft and arranged to engage and disengage said arm or lever by the operation of said rock shaft, a key mechanism for operating the rock shaft, and means for preventing the complete operation of said shaft except when the arm is in neutral position.

24. The combination with a frame formed with a slot, of an arm or lever movable through said slot, a rock shaft, a latch controlled by said shaft and arranged to engage and disengage said arm or lever by the operation of said rock shaft, a key mechanism for operating the rock shaft, and means carried by said arm or lever for preventing the complete operation of said shaft except when the arm is in neutral position.

25. The combination with a frame for a motor, of a movable arm or lever, having a recessed or channeled portion formed by a pair of side walls, a rock shaft, a latch member controlled by said rock shaft and arranged to extend into said recessed or channeled portion of said arm or lever when moved in one direction by said shaft, and a key operated mechanism for rocking said shaft.

26. The combination of an arm or lever for controlling the operation of a motor, means for pivotally or swingably supporting said arm, a locking mechanism arranged to move into the path of movement of said arm to lock it against operation, and a pair of curved plates extending laterally from the opposite sides of said arm or lever for preventing the operation of the locking mechanism except when said arm or lever is in neutral position.

27. The combination with a motor and a controller therefor, of a movable arm or lever for operating the controller, a latch arranged to engage with the said arm or lever to lock the same in its off-position, a bell circuit carried by the motor vehicle, key-operated mechanism for operating the latch into and out of engagement with the said arm or lever, and means operated by the latch-operating mechanism for breaking the said bell circuit.

28. The combination of a movable arm or lever arranged to control the operation of a vehicle, an electric circuit including a stationary contact and a movable contact, a locking mechanism for locking the said arm or lever against operation comprising a rock shaft, a latch controlled directly by said rock shaft and arranged to engage and disengage said arm or lever, and key-operated means for operating said rock shaft, and a device carried by said rock shaft and arranged to engage said movable contact for opening and closing said electric circuit.

29. In a controlling mechanism for a motor device, the combination with the motor control member, of a pivotally supported frame connected with said control member, said frame being provided with a back and laterally projecting side members along a portion of its opposite sides, a hand lever for moving the frame on its pivot, the lower end of said lever being arranged between said laterally projecting side members, and means for pivotally connecting said hand lever to said frame between said side members and permitting the said lever to swing at right angles to the direction of movement of the said frame, and a stop device carried by said side members for limiting the swinging of said hand lever in one direction.

In testimony whereof I affix my signature, in the presence of two witnesses.

EMIL GRUENFELDT.

Witnesses:
F. H. TEAGLE,
E. C. GUSTAFSON.